US012157317B2

(12) United States Patent
Kanki et al.

(10) Patent No.: US 12,157,317 B2
(45) Date of Patent: Dec. 3, 2024

(54) CLEANING UNIT, PRINTING APPARATUS AND ROLL DIAMETER ACQUISITION METHOD

(71) Applicant: SCREEN HOLDINGS CO., LTD., Kyoto (JP)

(72) Inventors: Koji Kanki, Kyoto (JP); Yasunori Akiyoshi, Kyoto (JP); Shogo Muto, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 108 days.

(21) Appl. No.: 17/897,679

(22) Filed: Aug. 29, 2022

(65) Prior Publication Data

US 2023/0101659 A1 Mar. 30, 2023

(30) Foreign Application Priority Data

Sep. 24, 2021 (JP) ................................ 2021-156160

(51) Int. Cl.
*B41J 2/165* (2006.01)

(52) U.S. Cl.
CPC ....... *B41J 2/16535* (2013.01); *B41J 2/16552* (2013.01); *B41J 2002/1655* (2013.01); *B41J 2002/16558* (2013.01)

(58) Field of Classification Search
CPC ................ B41J 2/16535; B41J 2/16552; B41J 2002/1655; B41J 2002/16558
See application file for complete search history.

(56) References Cited

U.S. PATENT DOCUMENTS

| | | | | |
|---|---|---|---|---|
| 2008/0018677 A1* | 1/2008 | White | B41J 2/16535 | 347/35 |
| 2013/0222475 A1* | 8/2013 | Inoue | B41J 2/165 | 347/33 |
| 2016/0200106 A1 | 7/2016 | Nakano | | |
| 2017/0259574 A1 | 9/2017 | Fujioka | | |
| 2017/0274688 A1* | 9/2017 | Hatada | B65H 23/188 | |

FOREIGN PATENT DOCUMENTS

| | | |
|---|---|---|
| JP | 2010-207728 A | 9/2010 |
| JP | 2012-051142 A | 3/2012 |
| JP | 2012-176545 A | 9/2012 |
| JP | 2015-080913 A | 4/2015 |
| JP | 6900995 B2 | 7/2021 |

OTHER PUBLICATIONS

Extended European Search Report issued in corresponding European Patent Application No. 22193390.6-1014, dated Feb. 21, 2023.

* cited by examiner

*Primary Examiner* — Jason S Uhlenhake
(74) *Attorney, Agent, or Firm* — Rimon P.C.

(57) ABSTRACT

The ratio of the rotation speed Nr of the take-up roller (take-up rotation speed) and the rotation speed Nu of the feeding roller (feeding rotation speed) is used. That is, knowledge that the roll diameter Drr of the sheet S taken up on the take-up roller is given by a function using the ratio of the rotation speeds Nr and Nu as a variable was obtained. Accordingly, the roll diameter Drr is computed from this ratio.

14 Claims, 9 Drawing Sheets

CLEANING UNIT, PRINTING APPARATUS AND ROLL DIAMETER ACQUISITION METHOD

CROSS REFERENCE TO RELATED APPLICATION

The disclosure of Japanese Patent Application No. 2021-156160 filed on Sep. 24, 2021 including specification, drawings and claims is incorporated herein by reference in its entirety.

BACKGROUND OF THE INVENTION

1. Field of the Invention

This invention relates to a technique for cleaning a discharge head for discharging an ink with a sheet.

2. Description of the Related Art

In a printing apparatus using a discharge head for discharging an ink from nozzles, cleaning for removing the ink adhering to the discharge head needs to be performed as appropriate. For example, in a cleaning method of JP 2012-176545A, an ink adhering to a discharge head is wiped out by bringing a sheet into contact with the discharge head by a wiping roller between a feeding roller and a take-up roller while conveying the sheet in a roll-to-roll manner from the feeding roller to the take-up roller.

SUMMARY OF THE INVENTION

To reliably wipe out the ink from the discharge head by such a cleaning method, it is suitable to take up the sheet fed from the feeding roller at a high speed by the take-up roller and sufficiently feed a new sheet to the discharge head. However, the discharge head might be damaged by sliding the sheet at a high speed with respect to the discharge head. Thus, a speed at which the sheet wipes a discharge head, in other words, a sheet conveying speed in a contact part of the sheet and the discharge head, has a proper value. Accordingly, it is considered to compute this conveying speed from a rotation speed of the take-up roller. However, to that end, a roll diameter of the sheet wound on the take-up roller is necessary.

This invention was developed in view of the above problem and aims to make it possible to obtain a roll diameter of a sheet on a take-up roller for taking up the sheet for wiping out an ink from the discharge head.

A cleaning unit according to the invention, comprises: a feeding roller on which a sheet cleaning a discharge head which discharges an ink is wound in a rolled manner; a take-up roller on which the sheet fed from the feeding roller is wound in a rolled manner; a take-up motor rotating the take-up roller to take up the sheet fed from the feeding roller on the take-up roller; a wiping roller bringing the sheet being conveyed from the feeding roller to the take-up roller by the take-up motor into contact with the discharge head, a rotation detector detecting a feeding rotation speed, the feeding rotation speed being a rotation speed of the feeding roller; and a controller controlling drive of the take-up motor, wherein the controller includes a computer computing a roll diameter of the sheet taken up in a rolled manner on the take-up roller based on a ratio of a take-up rotation speed and the feeding rotation speed, the take-up rotation speed being a rotation speed of the take-up roller rotated by the take-up motor.

A roll diameter acquisition method according to the invention, comprises: taking up a sheet, which cleans a discharge head discharging an ink, fed from a feeding roller on which the sheet is wound in a rolled manner by a take-up roller; and computing a roll diameter of the sheet taken up in a rolled manner on the take-up roller based on a ratio of a take-up rotation speed and a feeding rotation speed, the take-up rotation speed being a rotation speed of the take-up roller, the feeding rotation speed being a rotation speed of the feeding roller.

In the thus configured invention (cleaning unit and roll diameter acquisition method), the ratio of the take-up rotation speed, which is the rotation speed of the take-up roller, and the feeding rotation speed, which is the rotation speed of the feeding roller, is used. That is, as described in detail later, the inventor of this application obtained knowledge that the roll diameter of the sheet taken up on the take-up roller was given by a function using the ratio of the take-up rotation speed and the feeding rotation speed as a variable. Accordingly, this roll diameter is computed from the ratio of the take-up rotation speed and the feeding rotation speed. In this way, it is possible to obtain the roll diameter of the sheet on the take-up roller taking up the sheet for wiping out the ink from the discharge head.

As described above, according to the invention, it is possible to obtain a roll diameter of a sheet on a take-up roller for winding the sheet for wiping out an ink from the discharge head.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE PREFERRED EMBODIMENTS

Figure 1:
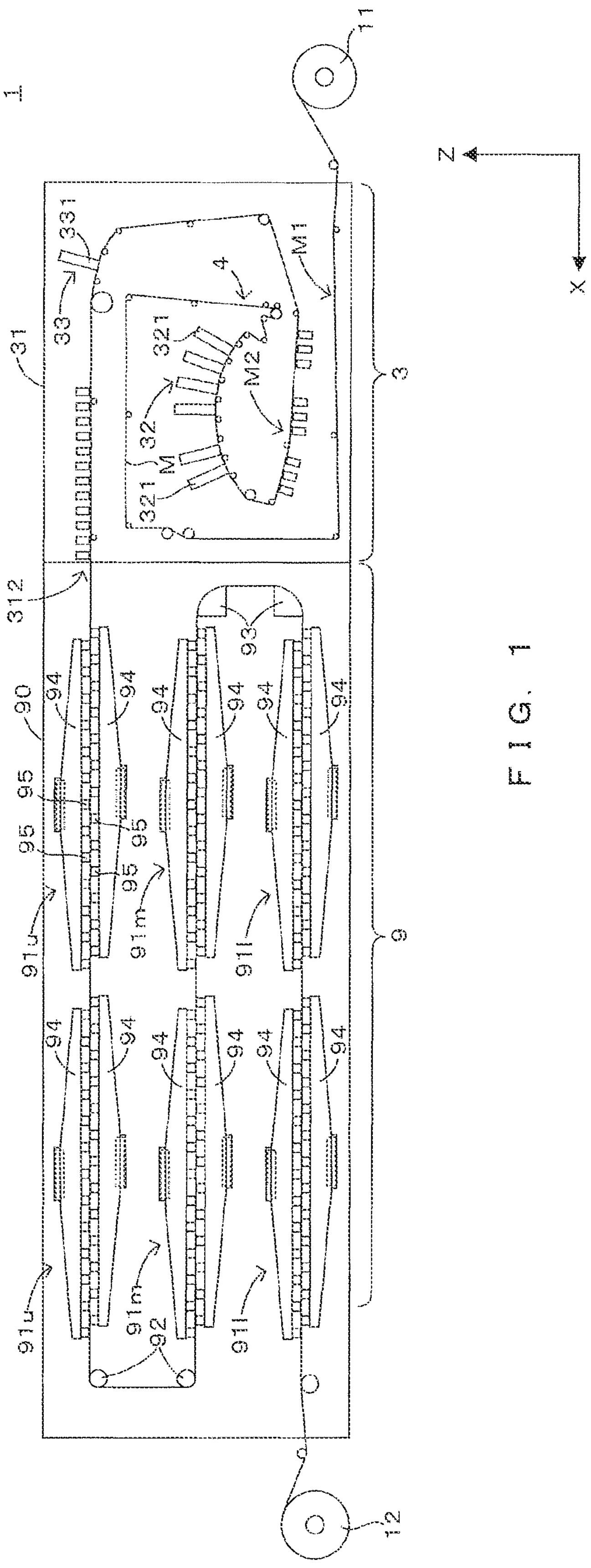
FIG. 1 is a front view schematically showing an example of a printing system provided with a printing apparatus according to the invention.

FIG. 1 is a front view schematically showing an example of a printing system provided with a printing apparatus according to the invention. In FIG. 1 and subsequent figures, a horizontal direction X and a vertical direction Z are shown as appropriate. As shown in FIG. 1, the printing system 1 includes a printing apparatus 3 and a drying apparatus 9 arrayed in the horizontal direction X. This printing system 1 conveys a printing medium M in the form of a long band in a roll-to-roll manner from a feeding roll 11 to a take-up roll 12. Note that a material of the printing medium M is a film of OPP (oriented polypropylene), PET (polyethylene terephthalate) or the like. However, the material of the printing medium M is not limited to the film and may be paper or the like. Such a printing medium M is flexible. Further, out of both surfaces of the printing medium M, a surface on which an image is printed is referred to as a front surface M1 and a surface opposite to the front surface M1 is referred to as a back surface M2 as appropriate.

The printing apparatus 3 prints an image on the front surface M1 of the printing medium M by discharging water-based inks to the front surface M1 of the printing medium M being conveyed from the feeding roll 11 to the take-up roll 12 in an ink-jet method. A detailed configuration of such a printing apparatus 3 is described later. The printing medium M having the image printed in this way is conveyed in the horizontal direction X from the printing apparatus 3 to the drying apparatus 9.

The drying apparatus 9 includes a drying furnace 90 and dries the printing medium M carried out from the printing apparatus 3 as the printing medium M is conveyed from the feeding roll 11 to the take-up roll 12. Two upper-stage blower units 91*u* arrayed in the horizontal direction X, two middle-stage blower units 91*m* arrayed in the horizontal direction X below these upper-stage blower units 91*u* and two lower-stage blower units 91*l* arrayed in the horizontal direction X below these middle-stage blower units 91*m* are provided in the drying furnace 90.

The printing medium M carried out through a carry-out port 312 of the printing apparatus 3 is folded toward the two middle-stage blower units 91*m* by one pair of rollers 92 after passing in the horizontal direction X through the two upper-stage blower units 91*u*. Subsequently, the printing medium M is folded toward the two lower-stage blower units 91*l* by one pair of air turn bars 93 after passing in the horizontal direction X through the two middle-stage blower units 91*m*. Further, the printing medium M is carried out to the outside of the drying apparatus 9 after passing in the horizontal direction X through the two lower-stage blower units 91.

The upper-stage blower unit 91*u* includes two blower chambers 94 arranged to sandwich the printing medium M passing in the horizontal direction X in the vertical direction Z. Each blower chamber 94 includes a plurality of nozzles 95 arrayed in the horizontal direction X and injects hot air (gas of 60° C. or higher) from the nozzles 95 to the printing medium M. In this way, the printing medium M is dried by the hot air injected from the nozzles 95 of these blower chambers 94 while passing between the two blower chambers 94 provided on upper and lower sides. Further, each of the middle-stage blower units 91*m* and the lower-stage blower units 91*l* also includes two blower chambers 94 for sandwiching the printing medium M in the vertical direction Z, similarly to the upper-stage blower units 91*u*.

By the way, a specific configuration of the upper-stage blower unit 91*u* is not limited to the one in this example. For example, a plurality of rollers arrayed in the horizontal direction X may be provided instead of the lower blower chamber 94, out of the upper and lower blower chambers 94 of the upper-stage blower unit 91*u*. In such a configuration, the hot air can be injected to the front surface M1 of the printing medium M from the upper blower chamber 94 while the back surface M2 of the printing medium M is supported from below by the plurality of rollers.

Figure 2:
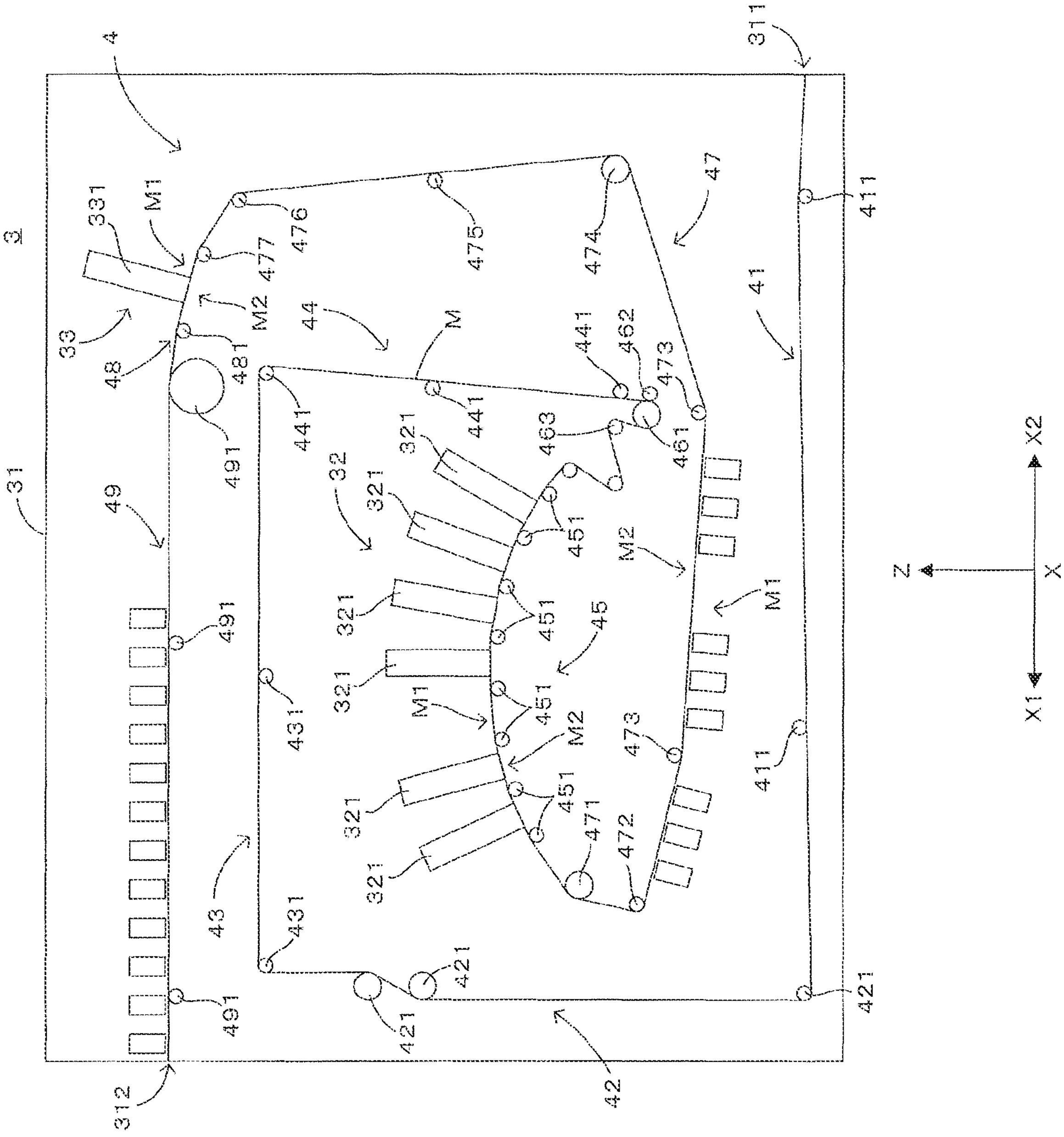
FIG. 2 is a front view schematically showing the printing apparatus equipped in the printing system of FIG. 1.

FIG. 2 is a front view schematically showing the printing apparatus equipped in the printing system of FIG. 1. In FIG. 2, one side X1 and another side X2 in the horizontal direction X are shown as appropriate. Here, the one side X1 is a side from the printing apparatus 3 toward the drying apparatus 9, and the other side X2 is a side opposite to the one side X1. The printing apparatus 3 includes a housing 31, a color printing unit 32 arranged in the housing 31, a white printing unit 33 arranged above the color printing unit 32 in the housing 31, and a conveyor 4 for conveying the printing medium M by a plurality of rollers arranged in the housing 31.

The color printing unit 32 includes a plurality of (six) head units 321 arrayed in a moving direction (direction from the other side X2 toward the one side X1) of the printing medium M above the printing medium M being conveyed by the conveyor 4. The plurality of head units 321 include nozzles facing the front surface M1 of the printing medium M passing therebelow from above, and discharge color inks having mutually different colors in the ink-jet method. Here, the color inks mean inks other than that having a white color and include inks of cyan, magenta, yellow, black and the like. In this way, the plurality of head units 321 of the color printing unit 32 print a color image on the front surface M1 of the printing medium M by discharging the color inks to the front surface M1 of the printing medium M passing therebelow from above.

Further, the white printing unit 33 includes a single head unit 331 arranged above the printing medium M being conveyed by the conveyor 4. The head unit 331 includes nozzles facing the front surface M1 of the printing medium M passing therebelow from above, and discharges a white ink from the nozzles in the ink-jet method. In this way, the head unit 331 of the white printing unit 33 prints a white image on the front surface M1 of the printing medium M by discharging the white ink to the front surface M1 of the printing medium M passing therebelow from above.

A carry-in port 311 is open in a side wall on the other side X2 of the housing 31, whereas a carry-out port 312 is open in a side wall on the one side X1 of the housing 31. The conveyor 4 conveys the printing medium M from the carry-in port 311 to the carry-out port 312 by way of the color printing unit 32 and the white printing unit 33 described above.

This conveyor 4 includes a carry-in part 41 provided below the color printing unit 32, an ascending conveyor 42 provided on the one side X1 of the color printing unit 32, an upper conveyor 43 provided above the color printing unit 32 and a descending conveyor 44 provided on the other side X2 of the color printing unit 32. The carry-in part 41 conveys the printing medium M carried in through the carry-in port 311 toward the one side X1 by rollers 411, the ascending conveyor 42 conveys the printing medium M conveyed by the carry-in part 41 upward by rollers 421, the upper conveyor 43 conveys the printing medium M conveyed by the ascending conveyor 42 toward the other side X2 by rollers 431, and the descending conveyor 44 conveys the printing medium M conveyed by the upper conveyor 43 downward by rollers 441.

Further, the conveyor 4 includes a color conveyor 45 for supporting the printing medium M facing the color printing unit 32 from below, and the printing medium M passed through the descending conveyor 44 enters the color conveyor 45. This color conveyor 45 includes a plurality of rollers 451 arrayed from the other side X2 to the one side X1 and each roller 451 contacts the back surface M2 of the printing medium M from below. In this way, the front surface M1 of the printing medium M supported by the color conveyor 45 is facing up and each head unit 321 of the color printing unit 32 discharges the color ink to this front surface M1 while facing this front surface M1 from above.

Further, the conveyor 4 includes rollers 461, 462 and 463 arranged between the color conveyor 45 and the descending conveyor 44 in the moving direction of the printing medium M. The roller 461 is a drive roller for driving the printing medium M. The rollers 462, 463 are driven rollers which rotate, following the printing medium M.

Furthermore, the conveyor 4 includes an inverting conveyor 47 for vertically inverting the printing medium M conveyed to the one side X1 from the color conveyor 45 twice. This inverting conveyor 47 includes a plurality of the rollers 471 to 477 including the drive roller 471, and these rollers 471 to 477 vertically invert the printing medium M twice while contacting the back surface M2 of the printing medium M. That is, the inverting conveyor 47 vertically inverts the front surface M1 and the back surface M2 of the printing medium M by conveying the printing medium M conveyed from the color conveyor 45 downward by the rollers 471, 472 and further conveying the printing medium M with the moving direction of the printing medium M changed to the one toward the other side X2 by the roller 472. Subsequently, the inverting conveyor 47 conveys the printing medium M from the one side X1 to the other side X2 by a plurality of the rollers 473 and then conveys the printing medium M upward by the rollers 474 to 476. Further, the inverting conveyor 47 vertically inverts the front surface M1 and the back surface M2 of the printing medium M again and conveys the printing medium M from the other side X2 to the one side X1 by the roller 477 by changing the moving direction of the printing medium M toward the one side X1 by the roller 476.

Further, the conveyor 4 includes a white conveyor 48 for supporting the printing medium M facing the white printing unit 33 from below, and the printing medium M vertically inverted twice by the inverting conveyor 47 enters the white conveyor 48. This white conveyor 48 includes a roller 481 configured to contact the back surface M2 of the printing medium M from below. In this way, the front surface M1 of the printing medium M supported by the white conveyor 48 is facing up, and the head unit 331 of the white printing unit 33 discharges the white ink to this front surface M1 while facing this front surface M1 from above.

Furthermore, the conveyor 4 includes a carry-out part 49 provided above the upper conveyor 43. The carry-out part 49 includes a plurality of rollers 491 arrayed from the other side X2 to the one side X1 in the horizontal direction X. This carry-out part 49 conveys the printing medium M conveyed by the white conveyor 48 to the drying apparatus 9 through the carry-out port 312 of the housing 31 by conveying the printing medium M to the one side X1 by the plurality of rollers 491.

As described above, the color printing unit 32 and the white printing unit 33 of the printing apparatus 3 include the head units 321, 331. Next, these head units 321, 331 are described. Note that each head unit 321, 331 has a common basic configuration. Accordingly, one head unit 321 is described below and the other head units 321, 331 are not described.

Figure 3:
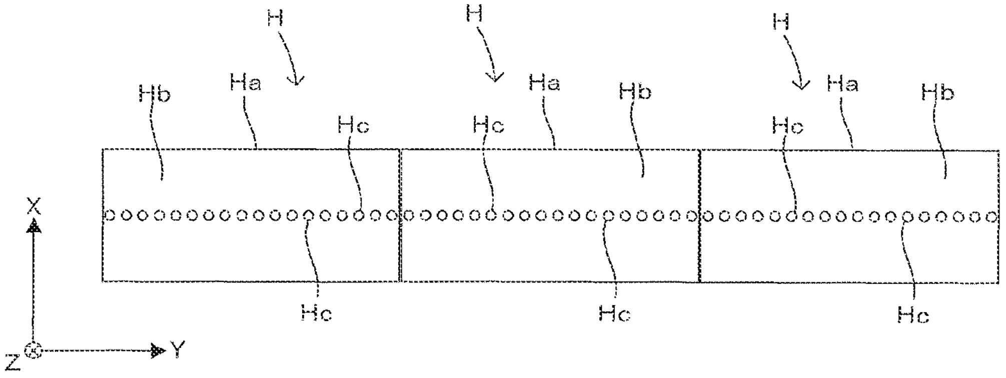
FIG. 3 is a diagram schematically showing the bottom surface of the head unit.

FIG. 3 is a diagram schematically showing the bottom surface of the head unit. In FIG. 3, a horizontal direction Y orthogonal to the horizontal direction X is shown in addition to the horizontal direction X and the vertical direction Z. As shown in FIG. 3, a plurality of discharge heads H for discharging the ink of the same color are arrayed in a row in the horizontal direction Y in the head unit 321. Note that an array mode of the discharge heads H is not limited to an example of FIG. 3 and the plurality of discharge heads H may be arrayed in a staggered manner.

This discharge head H has a housing Ha and the bottom surface of the housing Ha is an ink discharging flat surface Hb facing the front surface M1 of the printing medium M. A plurality of nozzles Hc are arrayed in the horizontal direction Y and open in this ink discharging flat surface Hb. Note that, although the plurality of nozzles Hc are arrayed in a row in the example of FIG. 3, an array mode of these nozzles He is not limited to this example and the nozzles He may be, for example, arrayed in a staggered manner in the horizontal direction Y. Each nozzle He provided in the ink discharging flat surface Hb in this way discharges the ink toward the front surface M1 of the printing medium M. Note that the ink can be discharged by various ink-jet techniques such as a piezo technique or thermal technique.

Further, the printing apparatus 3 includes a maintenance unit 51 (FIG. 4) for performing maintenance for the respective discharge heads H. Next, the maintenance unit 51 is described using FIG. 4. Note that the maintenance unit 51 is arranged for each of the plurality of head units 321, 331 and the configuration and operation of the maintenance unit 51 provided in each head unit 321, 331 are common. Thus, one maintenance unit 51 is described here.

Figure 4:
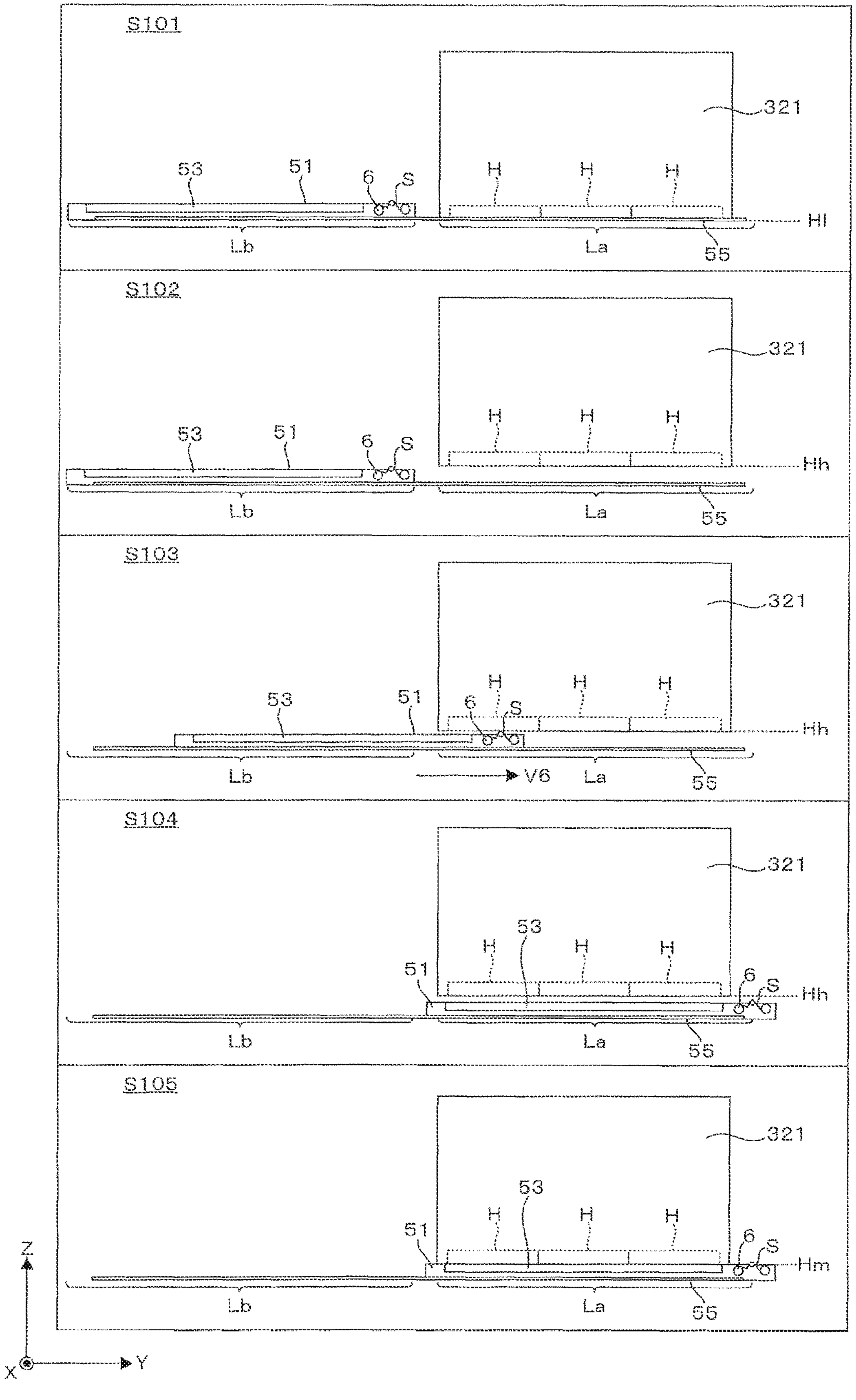
FIG. 4 is a diagram schematically showing the configuration and operation of the maintenance unit.

FIG. 4 is a diagram schematically showing the configuration and operation of the maintenance unit. As shown in FIG. 4, the printing apparatus 3 includes the maintenance unit 51 and a linear motion mechanism 55 for driving the maintenance unit 51 in the horizontal direction Y. This linear motion mechanism 55 includes, for example, a ball screw or a linear motor and moves the maintenance unit 51 between a facing position La and a retracted position Lb provided at an interval from the facing position La in the horizontal direction Y. The maintenance unit 51 located at the facing position La faces the plurality of discharge heads H, whereas the maintenance unit 51 located at the retracted position Lb does not face the plurality of discharge heads H. Further, to avoid interference with the maintenance unit 51, the plurality of discharge heads H can be integrally raised and lowered. Particularly, the plurality of discharge heads H are located at any one of a printing height Hl, a cap height Hm higher than the printing height Hl and a retracted height Hh higher than the cap height Hm.

This maintenance unit 51 includes a cap 53 for covering the discharge heads H from below and a cleaning unit 6 to be described in detail later. This cleaning unit 6 performs cleaning to wipe out the ink adhering to the ink discharging flat surfaces Hb of the discharge heads H with a sheet S. A fabric in form of a long band is used as the sheet S. However, a material of the sheet S is not limited to the fabric and may be, for example, paper. Next, an execution procedure of cleaning using the sheet S is described through Steps S101 to S105 of FIG. 4.

In a field of Step S101 of FIG. 4, a state is shown in which a printing operation is performed to print an image on the printing medium M by discharging the ink from the nozzles Hc of the discharge heads H. In Step S101, the discharge heads H are located at the printing height Hl and the maintenance unit 51 is located at the retracted position Lb. When this printing operation is finished, the plurality of discharge heads H are raised from the printing height Hl to the retracted height Hh (Step S102). In this way, a space into which the maintenance unit 51 enters is formed below the respective discharge heads H.

In Step S103, the maintenance unit 51 starts to move from the retracted position Lb to the facing position La. This causes the cleaning unit 6 to move at a speed V6 in the horizontal direction Y while causing the sheet S to contact the ink discharging flat surfaces Hb of the discharge heads H. In this way, the ink adhering to the ink discharging flat surfaces Hb is wiped out with the sheet S (cleaning).

When the maintenance unit 51 reaches the facing position La (Step S104), the cap 53 of the maintenance unit 51 faces the plurality of discharge heads H from below. On the other hand, the cleaning unit 6 stops at a position projecting from the plurality of discharge heads H in the horizontal direction Y. Subsequently, the plurality of discharge heads H are lowered from the retracted height Hh to the cap height Hm (Step S105). In this way, each discharge head H is covered from below by the cap 53 (capping).

Figure 5:
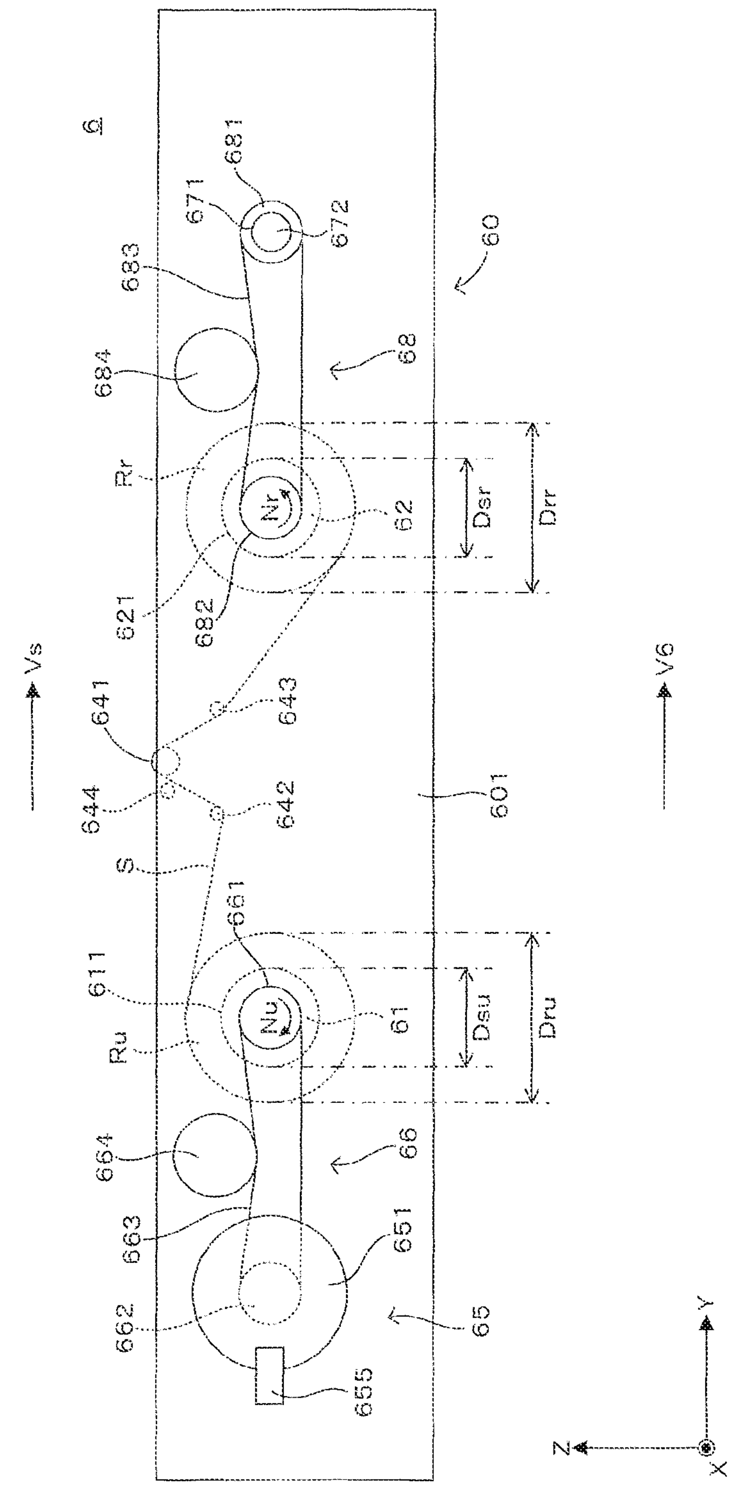
FIG. 5 is a partial side view schematically showing the configuration of the cleaning unit in a side view.
Figure 6:
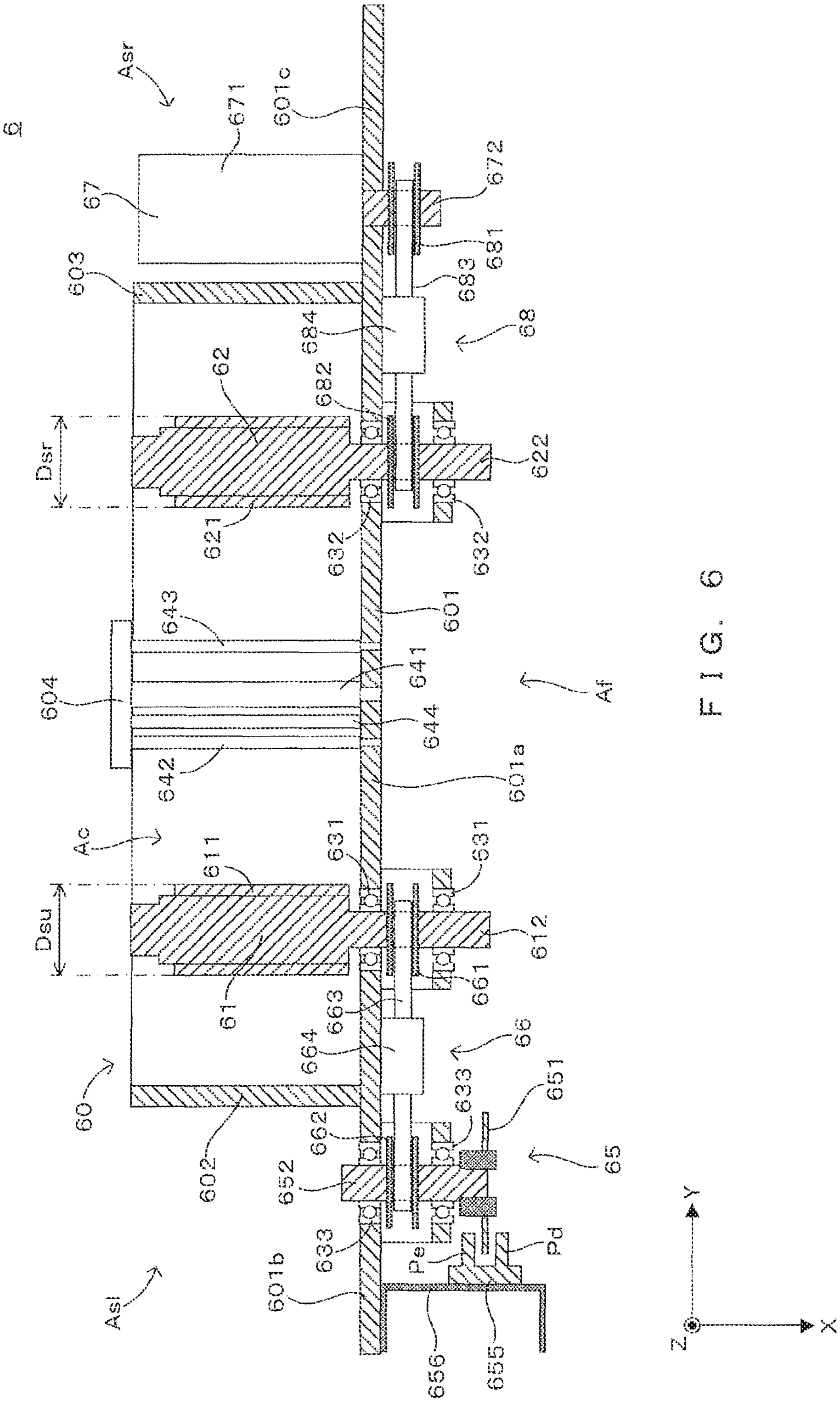
FIG. 6 is a partial section schematically showing the configuration of the cleaning unit in a plan view.

FIG. 5 is a partial side view schematically showing the configuration of the cleaning unit in a side view, and FIG. 6 is a partial section schematically showing the configuration of the cleaning unit in a plan view. In FIG. 5, members hidden behind members in front are shown by broken lines. Note that the cleaning unit 6 is slightly inclined according to the posture of the head unit 321 or head unit 331 to be cleaned. However, since the inclination of the cleaning unit 6 is slight, inclination is not expressed in these figures.

The cleaning unit 6 includes a housing 60. This housing 60 includes a separation wall 601 extending in the horizontal direction Y and orthogonal to the horizontal direction X. The separation wall 601 has a rectangular shape in a side view from the horizontal direction X. Further, the housing 60 includes a pair of a separation wall 602 and a separation wall 603 arrayed at an interval in the horizontal direction Y. Each of the separation walls 602, 603 extends in the horizontal direction X toward the inside (upper side of FIG. 6) of the housing 60 from the separation wall 601 and is orthogonal to the horizontal direction Y. In this way, the separation wall 601 has a central part 601*a* provided between the separation walls 602 and 603 in the horizontal direction Y and end parts 601*b*, 601*c* provided on both sides of the central part 601*a*. In the horizontal direction Y, the end part 601*b* projects toward a side opposite to the central part 601*a* from the separation wall 602, and the end part 601*c* projects toward a side opposite to the central part 601*a* from the separation wall 603.

In this way, a cleaning region Ac (inside region of the housing 60) divided in three directions by the central part 601*a* of the separation wall 601 and the separation walls 602, 603, a front region Af on a side opposite to the cleaning region Ac with respect to the separation wall 601, a side region As1 divided in two directions by the end part 601*b* of the separation wall 601 and the separation wall 602 and a side region Asr divided in two directions by the end part 601*c* of the separation wall 601 and the separation wall 603 are provided. That is, in a plan view, the cleaning region Ac and the front region Af are divided by the central part 601*a* of the separation wall 601, the cleaning region Ac and the side region As1 are divided by the separation wall 602, and the cleaning region Ac and the side region Asr are divided by the separation wall 603.

Further, the cleaning unit 6 includes a feeding roller 61 and a take-up roller 62 which convey the sheet S in the cleaning region Ac. The feeding roller 61 and the take-up roller 62 are arranged at an interval in the horizontal direction Y between the separation walls 602 and 603, the feeding roller 61 is arranged closer to the separation wall 602, out of the separation walls 602, 603, and the take-up roller 62 is arranged closer to the separation wall 603, out of the separation walls 602, 603. Particularly, the cleaning unit 6 continuously supplies the new sheet S to the ink discharging flat surfaces Hb of the discharge heads H by conveying the sheet S in a roll-to-roll manner from the feeding roller 61 to the take-up roller 62 during the execution of the above cleaning (Step S103).

The feeding roller 61 is arranged in parallel to the horizontal direction X and supported rotatably about a center of rotation parallel to the horizontal direction X by the separation wall 601. The feeding roller 61 includes a cylindrical roller body 611 and a cylindrical rotary shaft 612 provided coaxially with the roller body 611. A diameter of the rotary shaft 612 is shorter than that of the roller body 611, and the rotary shaft 612 projects in the horizontal direction X from the roller body 611. The roller body 611 is arranged in the cleaning region Ac, and the rotary shaft 612 penetrates through the central part 601*a* of the separation wall 601 from the cleaning region Ac to the front region Af via a through hole provided in the separation wall 601. In contrast, a pair of bearings 631 are mounted on the central part 601*a* of the separation wall 601. One 631 of the pair of bearings 631 rotatably supports the rotary shaft 612 in the through hole of the separation wall 601, and the other bearing 631 is arranged in the front region Af and rotatably supports an end part of the rotary shaft 612 projecting into the front region Af from the separation wall 601. In this way, the rotary shaft 612 is rotatably supported by the pair of bearings 631.

The take-up roller 62 is arranged in parallel to the horizontal direction X and supported rotatably about a center of rotation parallel to the horizontal direction X by the separation wall 601. The take-up roller 62 includes a cylindrical roller body 621 and a cylindrical rotary shaft 622 provided coaxially with the roller body 621. A diameter of the rotary shaft 622 is shorter than that of the roller body 621, and the rotary shaft 622 projects in the horizontal direction X from the roller body 621. The roller body 621 is arranged in the cleaning region Ac, and the rotary shaft 622 penetrates through the central part 601*a* of the separation wall 601 from the cleaning region Ac to the front region Af via a through hole provided in the separation wall 601. In contrast, a pair of bearings 632 are mounted on the central part 601*a* of the separation wall 601. One 632 of the pair of bearings 632 rotatably supports the rotary shaft 622 in the through hole of the separation wall 601, and the other bearing 632 is arranged in the front region Af and rotatably supports an end part of the rotary shaft 622 projecting into the front region Af from the separation wall 601. In this way, the rotary shaft 622 is rotatably supported by the pair of bearings 632.

One end of the sheet S is wound in a rolled manner on the roller body 611 of the feeding roller 61, and the other end of the sheet S is wound in a rolled manner on the roller body 621 of the take-up roller 62. That is, a feeding roll Ru constituted by the rolled sheet S is supported on the feeding roller 61, and a take-up roll Rr constituted by the rolled sheet S is supported on the take-up roller 62. These feeding roll Ru and the take-up roll Rr are arranged in the cleaning region Ac. The sheet S has a front surface for wiping out the ink and a back surface opposite to the front surface, the feeding roll Ru is so wound that the front surface of the sheet S is located outside, and the take-up roll Ru is so wound that the front surface of the sheet S is located inside.

Further, the cleaning unit 6 includes a wiping roller 641 and a winding roller 642 and a winding roller 643 arranged in the cleaning region Ac. The wiping roller 641 is arranged in parallel to the horizontal direction X between the feeding roller 61 and the take-up roller 62, the winding roller 642 is arranged in parallel to the horizontal direction X between the feeding roller 61 and the wiping roller 641, and the winding roller 643 is arranged in parallel to the horizontal direction X between the wiping roller 641 and the take-up roller 62. The housing 60 includes a support plate 604 provided for these rollers 641, 642 and 643, and the separation wall 601 and the support plate 604 rotatably support the rollers 641, 642 and 643 while sandwiching the rollers 641, 642 and 643 in the horizontal direction X. That is, the roller 641, 642, 643 is rotatable about a center of rotation parallel to the horizontal direction X.

The winding roller 642 contacts the front surface of the sheet S fed from the feeding roll Ru of the feeding roller 61 from above, and the winding roller 643 contacts the front surface of the sheet S to be taken up on the take-up roll Rr of the take-up roller 62 from above. On the other hand, the wiping roller 641 is arranged above the winding roller 642 and the winding roller 643 and contacts the back surface of the sheet S conveyed from the winding roller 642 to the winding roller 643 from below. This wiping roller 641 partially projects upward from the separation wall 601. Thus, the sheet S wound on the wiping roller 641 projects upward from the separation wall 601 and contacts the ink discharging flat surfaces Hb of the discharge heads H. That is, the wiping roller 641 functions to wipe out the ink by the front surface of the sheet S by bringing the front surface of the sheet S into contact with the ink discharging flat surfaces Hb of the discharge heads H.

Further, the cleaning unit 6 includes a discharge rod 644 arranged in the cleaning region Ac. The discharge rod 644 is so supported on the separation wall 601 and the support plate 604 to face the front surface of the sheet S conveyed from the winding roller 642 to the wiping roller 641 from above. This discharge rod 644 discharges a cleaning liquid to the front surface of the sheet S located below. In this way, the cleaning liquid is supplied to the front surface of the sheet S before reaching the wiping roller 641. This cleaning liquid is, for example, constituted by components other than coloring components (pigments, dyes), out of ink components.

Further, the cleaning unit 6 includes a rotation detector 65 detecting a rotation speed of the feeding roller 61. This rotation detector 65 is arranged in the front region Af and mounted on the end part 601*b* of the separation wall 601. Specifically, the rotation detector 65 includes a rotary plate 651 (rotary blade) arranged in the front region Af and a rotary shaft 652 supporting the rotary plate 651. The rotary shaft 652 is provided coaxially with the rotary plate 651 and has a cylindrical shape. The rotary shaft 652 penetrates through the separation wall 601 from the front region Af to the side region Asl via a through hole provided in the end part 601*b* of the separation wall 601. In contrast, a pair of bearings 633 are provided on the end part 601*b* of the separation wall 601. One 633 of the pair of bearings 633 rotatably supports the rotary shaft 652 in the through hole of the separation wall 601, and the other bearing 633 is arranged in the front region Af and rotatably supports an end part of the rotary shaft 652 projecting into the front region Af from the separation wall 601. In this way, the rotary shaft 652 and the rotary plate 651 mounted on the rotary shaft 652 are rotatably supported by the pair of bearings 633.

Furthermore, the rotation detector 65 includes a photosensor 655 arranged in the front region Af and a mounting fitting 656 for mounting the photosensor 655 on the end part 601*b* of the separation wall 601. The photosensor 655 includes a light emitter Pe and a light receiver Pd. A peripheral edge part of the rotary plate 651 is located between the light emitter Pe and the light receiver Pd, the light receiver Pd does not detect light if the light emitted from the light emitter Pe is blocked by the rotary plate 651, and the light receiver Pd detects light if the light emitted from the light emitter Pe passes through the rotary plate 651.

Figure 7A:
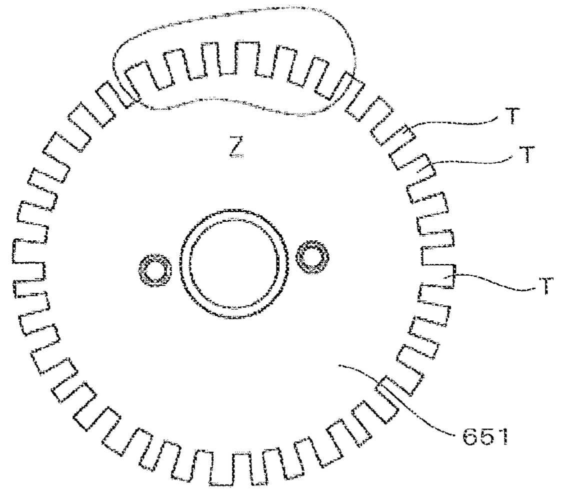
FIG. 7A is a diagram schematically showing the configuration of the rotary plate.
Figure 7B:
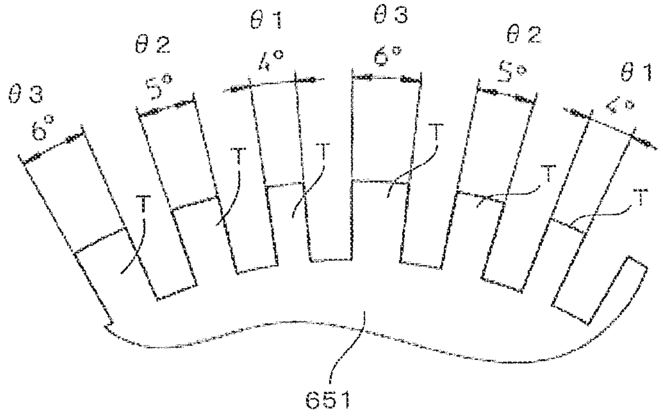
FIG. 7B is a partial enlarged view enlargedly showing a part of a range surrounded by a curved of FIG. 7A.

FIG. 7A is a diagram schematically showing the configuration of the rotary plate, and FIG. 7B is a partial enlarged view enlargedly showing a part of a range surrounded by a curved of FIG. 7A. As shown in FIG. 7A, a plurality of teeth T are arrayed at intervals in a circumferential direction on the peripheral edge part of the rotary plate 651. If light emitted from the light emitter Pe of the photosensor 655 is blocked by the tooth T, the light receiver Pd does not detect the light and the photosensor 655 outputs an off-signal. On the other hand, if light emitted from the light emitter Pe of the photosensor 655 passes through a slit between the teeth T, the light receiver Pd detects the light and the photosensor 655 outputs an on-signal. Therefore, the rotation speed of the rotary plate 651 can be detected based on a time interval at which the photosensor 655 alternately outputs the on-signal and the off-signal.

Particularly, as shown in FIG. 7B, the plurality of teeth T are so provided that widths of the teeth T periodically change. That is, the teeth T of the width corresponding to an angle $\theta 1$ (=4°), the teeth T of the width corresponding to an angle $\theta 2$ (=5°) larger than the angle $\theta 1$ and the teeth T of the width corresponding to an angle $\theta 3$ (=6°) larger than the angle $\theta 2$ are periodically arranged in this order. Accordingly, in FIG. 7B, the photosensor 655 detects the teeth T in the order of the angles $\theta 1$, $\theta 2$ and $\theta 3$ if the rotary plate 651 rotates clockwise, and the photosensor 655 detects the teeth T in the order of the angles $\theta 3$, $\theta 2$ and $\theta 1$ if the rotary plate 651 rotates counterclockwise. Therefore, the rotation direction of the rotary plate 651 can be detected based on changes of the time intervals at which the photosensor 655 outputs the off-signals.

Referring back to FIGS. 5 and 6, it is further described. As just described, the rotation detector 65 has a mechanism for detecting the rotation speed of the rotary plate 651 by the photosensor 655. Further, in the rotation detector 65, a one-way clutch or torque limiter is mounted on the rotary shaft 652, and the rotary shaft 652 is configured to rotate if a torque of a predetermined value or more is applied.

Further, the cleaning unit 6 includes a rotation transmitter 66 arranged in the front region Af, and the rotation of the feeding roller 61 is transmitted to the rotation detector 65 by this rotation transmitter 66. This rotation transmitter 66 includes a pulley 661 mounted on the rotary shaft 612 of the feeding roller 61, a pulley 662 mounted on the rotary shaft 652 of the rotary plate 651, an endless timing belt 663 mounted between the pulleys 661 and 662, and a winding roller 664 configured to contact the timing belt 662 from above. Accordingly, the rotation of the feeding roller 61 is transmitted to the rotary plate 651 by the pulley 661, the timing belt 663 and the pulley 662. Thus, a rotation speed and a rotation direction of the feeding roller 61 can be detected based on outputs (on-signals and off-signals) of the photosensor 655. Note that the pulleys 661, 662 have the same diameter and the rotation speed of the feeding roller 61 and that of the rotary plate 651 of the rotation detector 65 are equal.

Furthermore, the cleaning unit 6 includes a take-up motor 67 rotating the take-up roller 62. The take-up motor 67 includes a motor body 671 and a rotary shaft 672 projecting in the horizontal direction X from the motor body 671. The motor body 671 is arranged in the side region Asr, whereas the rotary shaft 672 projects from the side region Asr to the front region Sf via a through hole provided in the end part 601*c* of the separation wall 601. This rotary shaft 672 rotates about a center of rotation parallel to the horizontal direction X by a rotational drive force output by the motor body 671.

Further, the cleaning unit 6 includes a rotation transmitter 68 arranged in the front region Af, and the rotation of the rotary shaft 672 of the motor body 671 is transmitted to the take-up roller 62 by this rotation transmitter 68. This rotation transmitter 68 includes a pulley 681 mounted on the rotary shaft 672 of the take-up motor 67, a pulley 682 mounted on the rotary shaft 622 of the take-up roller 62, an endless timing belt 683 mounted between the pulleys 681 and 682, and a winding roller 684 configured to contact the timing belt 682 from above. Accordingly, the rotation of the rotary shaft 672 of the take-up motor 67 is transmitted to the take-up roller 62 by the pulley 681, the timing belt 683 and the pulley 682. Thus, the take-up motor 67 can rotate the take-up roller 62 at a predetermined rotation speed. Note that the pulleys 681, 682 have the same diameter, and the rotation speed of the rotary shaft 672 of the take-up motor 67 and that of the take-up roller 62 are equal.

In this cleaning unit 6, the roller body 611 of the feeding roller 61 has a diameter Dsu, the feeding roll Ru has a diameter Dru, the roller body 621 of the take-up roller 62 has a diameter Dsr and the take-up roll Rr has a diameter Drr as shown in FIG. 5. Further, the feeding roller 61 feeds the sheet S by rotating at a rotation speed Nu (rpm), and the take-up roller 62 takes up the sheet S by rotating at a rotation speed Nr (rpm). Note that, in this example, the diameters Dsu and Dsr are equal. However, these may be different.

Figure 8:
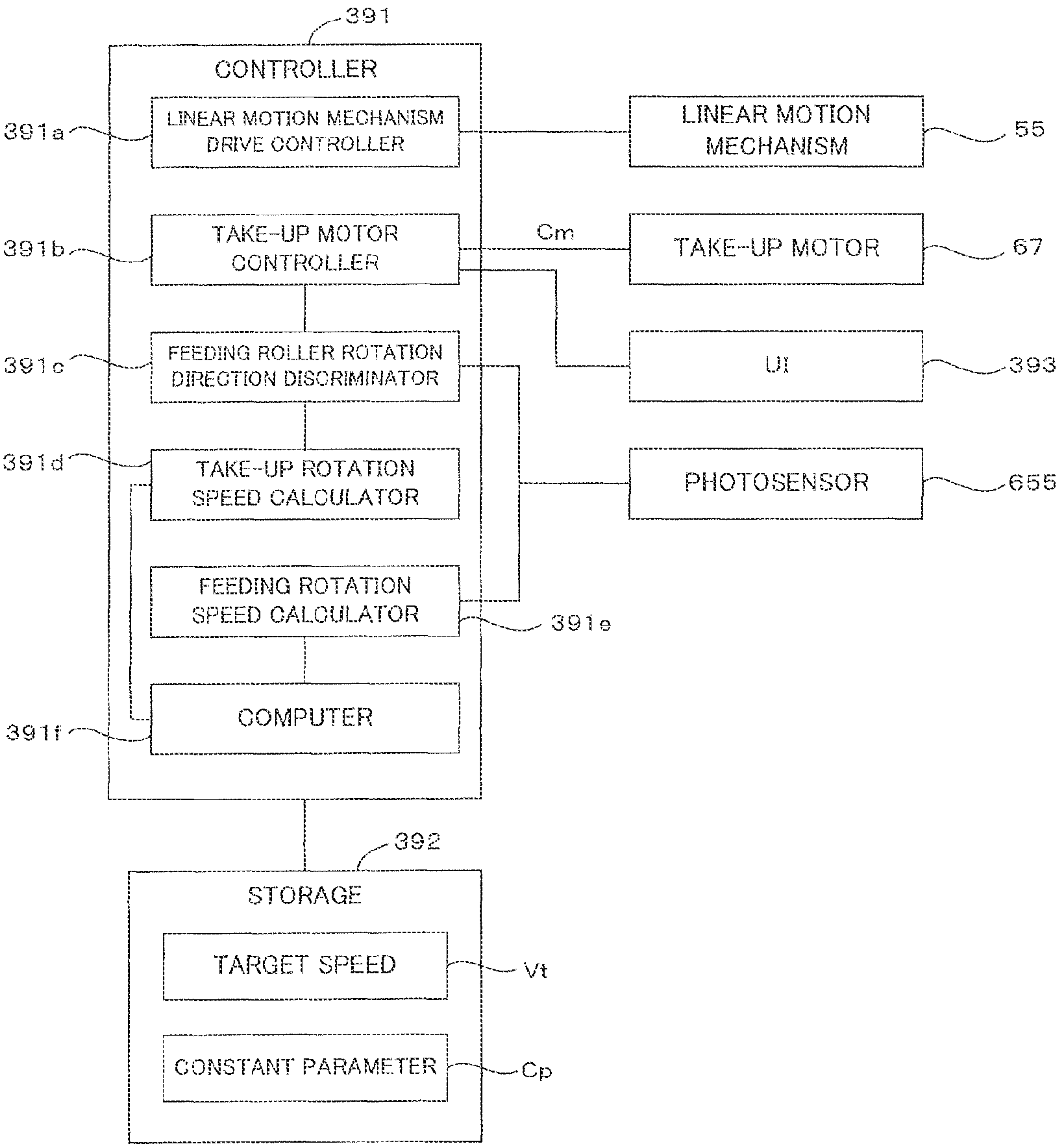
FIG. 8 is a diagram showing an electrical configuration of the printing apparatus.

FIG. 8 is a diagram showing an electrical configuration of the printing apparatus. As shown in FIG. 8, the printing apparatus 3 includes a controller 391 and a storage 392. The controller 391 is a processor such as a CPU (Central Processing Unit), and the storage 392 is a storage device such as an HDD (Hard Disk Drive) or SSD (Solid State Drive). The controller 391 controls each component of the printing apparatus 3, and the storage 392 stores data (target speed Vt and constant parameters Cp) used in a sheet conveyance control in the cleaning unit 6 to be described later. The target speed Vt is set based on an empirically obtained result on a conveying speed of the sheet S optimal for cleaning and stored in the storage 392 in advance. Further, the printing apparatus 3 includes a UI (User Interface) 393. This UI 393 can make notification to an operator by an indication on a display, an alarm sound or the like. As shown in FIG. 8, the controller 391 includes a linear motion mechanism drive controller 391*a*, a take-up motor controller 391*b*, a feeding roller rotation direction discriminator 391*c*, a take-up rotation speed calculator 391*d*, a feeding rotation speed calculator 391*e* and a computer 391*f* as functional parts thereof. The linear motion mechanism drive controller 391*a* controls the linear motion mechanism 55 to move the maintenance unit 51 in the horizontal direction Y.

In cleaning of FIG. 4 described above, the linear motion mechanism drive controller 391*a* controls the linear motion mechanism 55 to drive the maintenance unit 51 in the horizontal direction Y. In this way, the cleaning unit 6 provided in the maintenance unit 51 moves at the speed V6 in the horizontal direction Y. At this time, the take-up motor controller 391*b* sends a motor command value Cm (pulse signal) to the take-up motor 67 and controls to rotate the rotary shaft 672 of the take-up motor 67 at a rotation speed indicated by the motor command value Cm. By this control, the sheet S is conveyed at the speed Vs in the horizontal direction Y. In this way, the sheet S sandwiched by the wiping roller 641 and the ink discharging flat surfaces Hb is conveyed at the speed Vs in the same direction as that at the speed V6 while being moved at the speed V6. Next, a conveyance control of the sheet S executed at the time of cleaning is described.

Figure 9:
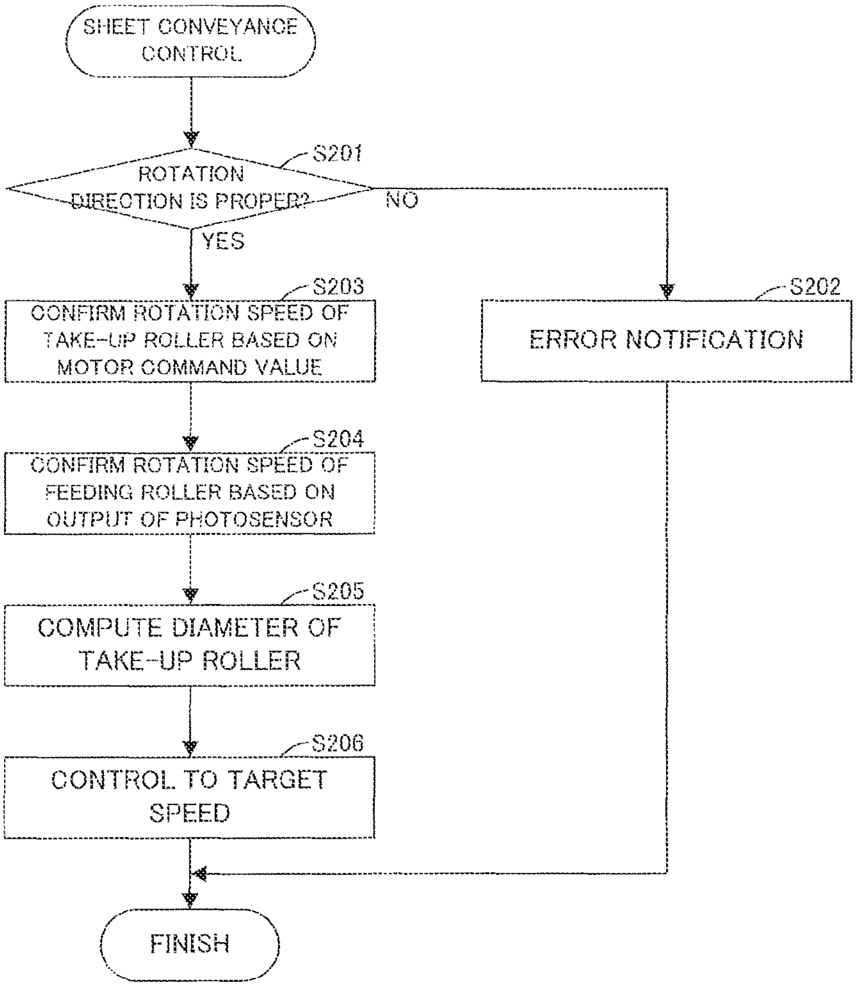
FIG. 9 is a flow chart showing an example of the sheet conveyance control.

FIG. 9 is a flow chart showing an example of the sheet conveyance control. Each step of FIG. 9 is performed by the controller 391. In Step S201, the feeding roller rotation direction discriminator 391*c* judges whether or not the rotation direction of the feeding roller 61 is proper based on a confirmation result on the rotation direction of the feeding roller 61 indicated by outputs of the photosensor 655. If this rotation direction is not proper ("NO" in Step S201), the take-up motor controller 391*b* stops the take-up motor 67 and causes the UI 393 to make error notification indicating that the orientation of the sheet S mounted on the feeding roller 61 is improper (Step S202).

If the rotation direction of the feeding roller 61 is proper ("YES" in Step S201), the take-up rotation speed calculator 391*d* confirms the rotation speed Nr (rpm) of the take-up roller 62 based on the motor command value Cm output to the take-up motor 67 (Step S203). As described above, since the diameters of the pulleys 681, 682 are equal, the rotation speed of the rotary shaft 672 of the take-up motor 67 indicated by the motor command value Cm is the rotation speed of the take-up roller 62. However, the pulleys 681, 682 may have different diameters. In this case, the take-up rotation speed calculator 391*d* may obtain the rotation speed of the take-up roller 62 based on the rotation speed indicated by the motor command value Cm according to a diameter difference between the pulleys 681 and 682.

In Step S204, the feeding rotation speed calculator 391*e* confirms the rotation speed Nu (rpm) of the feeding roller 61 based on outputs of the photosensor 655. As described above, since the diameters of the pulleys 661, 662 are equal, the rotation speed of the rotary plate 651 indicated by the output of the photosensor 655 is the rotation speed of the feeding roller 61. However, the pulleys 661, 662 may have different diameters. In this case, the feeding rotation speed calculator 391*e* may obtain the rotation speed of the feeding roller 61 based on the output of the photosensor 655 according to a diameter difference between the pulleys 661 and 662. Note that an execution order of Steps S203, S204 is not limited to that in this example and the execution order may be reversed or these steps may be simultaneously performed.

In Step S205, the computer 391*f* computes the diameter Drr of the take-up roll Rr based on a ratio of the rotation speed Nr of the take-up roller 62 and the rotation speed Nu of the feeding roller 61. The computation of this diameter Drr is based on the following knowledge. That is, if a length of the sheet S from the feeding roll Ru to the take-up roll Rr is sufficiently shorter than an entire length Lt of the sheet S, the following equation:

$$Lt=Lu+Lr$$

holds. Here, a length Lu is a length of the sheet S wound on the feeding roller 61 (i.e. sheets S constituting the feeding roll Ru), and a length Lr is a length of the sheet S wound on the take-up roller 62 (i.e. sheet S constituting the take-up roll Rr). Further, the following equations are expressed using an area Au of a side surface of the feeding roll Ru constituted by the sheet S wound on the feeding roller 61, an area Ar of a side surface of the take-up roll Rr constituted by the sheet S wound on the take-up roller 62, and a thickness tw of the sheet S:

$$Lu=Au/tw$$

$$Lr=Ar/tw$$

If these equations are simultaneously solved, $$Drr^2\times(Dru^2/Drr^2+1)=4\times Lt\times tw/\pi+(Dsr^2+Dsu^2)$$

is obtained. If the conveying speed of the sheet S is constant, the following equation holds:

$$Dru/Drr=Nr/Nu.$$

As a result, $$Drr^2\times(Nr^2/Nu^2+1)=4\times Lt\times tw/\pi+(Dsr^2+Dsu^2)$$

is obtained. Therefore, the diameter Drr of the take-up roller 62 is given by the following equation:

$$\{(4\times Lt\times tw/\pi+(Dsr^2+Dsu^2))/(Nr^2/Nu^2+1)\}^{1/2}.$$

That is, a variable of the diameter Drr is only a ratio of the rotation speed Nr and the rotation speed Nu.

Note that other constants are obtained as constant parameters Cp in advance and saved in the storage 392. That is, the following constants:

Entire length Lt of the sheet S,
Thickness tw of the sheet S,
Diameter Dsu of the feeding roller 61, and
Diameter Dsr of the take-up roller 62, are saved as the constant parameters Cp in the storage 392.

In Step S206, the take-up motor controller 391*b* computes the rotation speed of the take-up roller 62 necessary to convey the sheet S at the target speed Vt based on the diameter Drr of the take-up roll Ru and computes the motor command value Cm based on this rotation speed. Then, the take-up motor controller 391*b* sends the motor command value Cm to the take-up motor 67. The take-up motor 67 having received the motor command value Cm rotates the take-up roller 62 based on the motor command value Cm received from the controller 391. In this way, the sheet S pulled out from the feeding roller 61 is taken up on the take-up roller 62 and the sheet S is conveyed at the target speed Vt.

In the embodiment described above, the ratio of the rotation speed Nr of the take-up roller 62 (take-up rotation speed) and the rotation speed Nu of the feeding roller 61 (feeding rotation speed) is used. That is, as described above, knowledge that the roll diameter Drr of the sheet S taken up on the take-up roller 62 is given by a function using the ratio of the rotation speeds Nr and Nu as a variable was obtained. Accordingly, the roll diameter Drr is computed from this ratio. In this way, it is possible to obtain the roll diameter Drr of the sheet S on the take-up roller 62 for taking up the sheet S for wiping out the ink from the discharge heads H.

Further, the take-up motor 67 rotates at the rotation speed indicated by the motor command value Cm received from the take-up motor controller 391*b*. In contrast, the take-up rotation speed calculator 391*d* calculates the rotation speed Nr of the take-up roller 62 based on the rotation speed indicated by the motor command value Cm. In such a configuration, since it is not necessary to separately provide a detector for detecting the rotation speed Nr of the take-up roller 62, the cleaning unit 6 can be simplified and reduced in size.

Further, the separation wall 601 (first separation wall) is provided which divides the cleaning region Ac in which the feeding roller 61, the wiping roller 641 and the take-up roller 62 are arranged and the front region Af (first region) in which the rotation detector 65 is arranged. In such a configuration, it can be suppressed by the separation wall 601 that the ink wiped out from the discharge heads H scatters to the rotation detector 65 and contaminates the rotation detector 65. Particularly, if the ink adheres to the photosensor 655, it becomes difficult to precisely obtain the rotation speed of the feeding roller 61, but ink adhesion to the photosensor 655 can be suppressed by the separation wall 601.

Further, the separation wall 603 (second separation wall) is provided which divides the cleaning region Ac and the side region Asr (second region) in which the take-up motor 67 is arranged. In such a configuration, the scattering of the ink wiped out from the discharge heads H to the motor body 671 can be suppressed by the separation wall 603. Particularly, if the ink adheres to the take-up motor 67, an electrical system of the take-up motor 67 may be deteriorated, but ink adhesion to the electrical system can be suppressed by the separation wall 603.

Further, the rotation transmitter 66 (first rotation transmitter) is provided which transmits the rotation of the feeding roller 61 to the rotation detector 65. By interposing the rotation transmitter 66 in this way, the rotation detector 65 can be separated from the feeding roller 61. As a result, it can be suppressed that the ink wiped out from the discharge heads H scatters to the rotation detector 65 and contaminates the rotation detector 65.

Further, as shown in FIGS. 5 and 6, the rotation detector 65 is arranged on a side opposite to the wiping roller 641 with respect to the feeding roller 61 in the horizontal direction Y In such a configuration, the rotation detector 65 is arranged away from the wiping roller 641. As a result, it can be suppressed that the ink wiped out from the discharge heads H scatters to the rotation detector 65 and contaminates the rotation detector 65.

Further, the rotation transmitter 68 (second rotation transmitter) is provided which transmits the rotation of the take-up motor 67 to the take-up roller 62. By interposing the rotation transmitter 68 in this way, the take-up motor 67 can be separated from the take-up roller 62. As a result, it can be suppressed that the ink wiped out from the discharge heads H scatters to the take-up motor 67 and contaminates the take-up motor 67.

Further, as shown in FIGS. 5 and 6, the take-up motor 67 is arranged on a side opposite to the wiping roller 641 with respect to the take-up roller 62 in the horizontal direction Y. In such a configuration, the take-up motor 67 is arranged away from the wiping roller 641. As a result, it can be suppressed that the ink wiped out from the discharge heads H scatters to the take-up motor 67 and contaminates the take-up motor 67.

Further, the rotation detector 65 detects the rotation direction of the feeding roller 61. In such a configuration, it can be confirmed by the rotation direction of the feeding roller 61 that an operator erroneously set the orientation of the sheet S mounted on the feeding roller 61 to replenish the sheet S. As a result, erroneous mounting of the sheet S can be detected.

As described above, in this embodiment, the printing apparatus 3 corresponds to an example of a "printing apparatus" of the invention, the controller 391 corresponds to an example of a "controller" of the invention, the take-up motor controller 391*b* corresponds to an example of a "take-up motor controller" of the invention, the computer 391*f* corresponds to an example of a "computer" of the invention, the take-up rotation speed calculator 391*d* corresponds to an example of a "take-up rotation speed calculator" of the invention, the cleaning unit 6 corresponds to an example of a "cleaning unit" of the invention, the separation wall 601 corresponds to an example of a "first separation wall" of the invention, the separation wall 603 corresponds to an example of a "second separation wall" of the invention, the feeding roller 61 corresponds to an example of a "feeding roller" of the invention, the take-up roller 62 corresponds to an example of a "take-up roller" of the invention, the wiping roller 641 corresponds to an example of a "wiping roller" of the invention, the rotation detector 65 corresponds to an example of a "rotation detector" of the invention, the rotation transmitter 66 corresponds to an example of a "first rotation transmitter" of the invention, the take-up motor 67 corresponds to an example of a "take-up motor" of the invention, the rotation transmitter 68 corresponds to an example of a "second rotation transmitter" of the invention, the front region Af corresponds to an example of a "first region" of the invention, the cleaning region Ac corresponds to an example of a "region in which the feeding roller, the wiping roller and the take-up roller are arranged" of the invention, the side region Asr corresponds to an example of a "second region" of the invention, the motor command value Cm corresponds to an example of a "motor command value" of the invention, the diameter Drr corresponds to an example of a "roll diameter" of the invention, the discharge head H corresponds to an example of a "discharge head" of the invention, the rotation speed Nu corresponds to an example of a "feeding rotation speed" of the invention, the rotation speed Nr corresponds to an example of a "take-up rotation speed" of the invention, and the sheet S corresponds to an example of a "sheet" of the invention.

Note that the invention is not limited to the embodiment described above and various changes other than the aforementioned ones can be made without departing from the gist of the invention. For example, the controller 391 can compute the roll diameter Dru of the sheet S wound in a rolled manner on the feeding roller 61 based on the ratio of the take-up rotation speed Nr and the feeding rotation speed Nu. Here, a relationship of the ratio of the take-up rotation speed Nr and the feeding rotation speed Nu and the diameter Dru is obtained similarly to the relationship represented by the above knowledge. In such a configuration, the controller 391 can obtain a remaining amount of the sheet S wound on the feeding roller 61. Such a remaining amount may be, for example, displayed on the display of the UI 393.

Further, the operation of the maintenance unit 51 described above is merely an example and the cleaning timing and method of the maintenance unit 51 can be changed as appropriate. Accordingly, cleaning may be performed before the start of the printing operation or cleaning may be performed after the execution of purging to push out or suck out the ink from the nozzles Hc of the discharge heads H. Alternatively, the configuration of the cleaning unit 6 may be so changed that cleaning can be performed when the cleaning unit 6 moves from the facing position La to the retracted position Lb.

Further, a specific mechanism of the rotation transmitter 66 or 68 is not limited to a mechanism using pulleys and a timing blet and may be, for example, a mechanism for transmitting rotation by a gear train.

Further, the rotary plate 651 of the rotation detector 65 may be provided coaxially with the feeding roller 61 without providing the rotation transmitter 66.

Further, the rotary shaft 672 of the take-up motor 67 may be provided coaxially with the take-up roller 62 without providing the rotation transmitter 68. In this case, the take-up motor 67 may be arranged in the front region Af.

Further, the configuration of the rotary plate 651 of the rotation detector 65 may be changed as appropriate. For example, the plurality of teeth T may have the same width.

Further, cleaning may be performed by moving the discharge heads H in the horizontal direction Y and wiping out the ink on the ink discharging flat surfaces Hb of the discharge heads H with the sheet S. In short, the cleaning unit 6 may be relatively moved with respect to the discharge heads H.

The invention is applicable to techniques in general for cleaning a discharge head for discharging an ink with a sheet.

The cleaning unit may be configured so that the controller includes: a take-up motor controller sending a motor command value to the take-up motor and controlling the take-up motor so that the take-up motor rotates at a rotation speed indicated by the motor command value; and a take-up rotation speed calculator calculating the take-up rotation speed from the rotation speed indicated by the motor command value sent to the take-up motor by the take-up motor controller. In such a configuration, since it is not necessary to separately provide a detector detecting the rotation speed of the take-up roller, the cleaning unit can be simplified and reduced in size.

The cleaning unit may be configured so that the computer computes a roll diameter of the sheet wound in a rolled manner on the feeding roller based on the ratio of the take-up rotation speed and the feeding rotation speed. In such a configuration, the roll diameter of the sheet wound on the feeding roller, i.e. a remaining amount of the sheet, can be obtained.

The cleaning unit may further comprise a first separation wall dividing a region in which the feeding roller, the wiping roller and the take-up roller are arranged and a first region in which the rotation detector is arranged. In such a configuration, it can be suppressed by the first separation wall that the ink wiped out from the discharge head scatters to the rotation detector and contaminates the rotation detector.

The cleaning unit may further comprise a second separation wall dividing a region in which the feeding roller, the wiping roller and the take-up roller are arranged and a second region in which the take-up motor is arranged. In such a configuration, it can be suppressed by the second separation wall that the ink wiped out from the discharge head scatters to the take-up motor.

The cleaning unit may further comprise a first rotation transmitter transmitting rotation of the feeding roller to the rotation detector. By interposing the first rotation transmitter in this way, the rotation detector can be separated from the feeding roller. As a result, it can be suppressed that the ink wiped out from the discharge head scatters to the rotation detector and contaminates the rotation detector.

The cleaning unit may be configured so that the rotation detector is arranged on a side opposite to the wiping roller with respect to the feeding roller. In such a configuration, the rotation detector is arranged away from the wiping roller. As a result, it can be suppressed that the ink wiped out from the discharge head scatters to the rotation detector and contaminates the rotation detector.

The cleaning unit may further comprise a second rotation transmitter transmitting rotation of the take-up motor to the take-up roller. By interposing the second rotation transmitter in this way, the take-up motor can be separated from the take-up roller. As a result, it can be suppressed that the ink wiped out from the discharge head scatters to the take-up motor and contaminates the take-up motor.

The cleaning unit may be configured so that the take-up motor is arranged on a side opposite to the wiping roller with respect to the take-up roller. In such a configuration, the take-up motor is arranged away from the wiping roller. As a result, it can be suppressed that the ink wiped out from the discharge head scatters to the take-up motor and contaminates the take-up motor.

The cleaning unit may be configured so that the rotation detector detects a rotation direction of the feeding roller. In such a configuration, it can be confirmed by the rotation direction of the feeding roller that an operator erroneously set the orientation of the sheet mounted on the feeding roller to replenish the sheet. As a result, erroneous mounting of the sheet can be detected.

A printing apparatus according to the invention, comprises: a discharge head discharging an ink to a printing medium; and the above cleaning the discharge head. Therefore, it is possible to obtain the roll diameter of the sheet on the take-up roller taking up the sheet for wiping out the ink from the discharge head.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. A cleaning unit, comprising:

a feeding roller on which a sheet cleaning a discharge head which discharges an ink is wound in a rolled manner;

a take-up roller on which the sheet fed from the feeding roller is wound in a rolled manner;

a take-up motor rotating the take-up roller to take up the sheet fed from the feeding roller on the take-up roller;

a wiping roller bringing the sheet being conveyed from the feeding roller to the take-up roller by the take-up motor into contact with the discharge head, a rotation detector detecting a feeding rotation speed, the feeding rotation speed being a rotation speed of the feeding roller;

a storage storing information about an entire length of the sheet, a thickness of the sheet, a diameter of the feeding roller, and a diameter of the take-up roller; and a controller controlling drive of the take-up motor, wherein the controller includes a computer computing a roll diameter of the sheet taken up in a rolled manner on the take-up roller based on i) a ratio of a take-up rotation speed, the feeding rotation speed, ii) the entire length of the sheet, iii) the thickness of the sheet, iv) the diameter of the feeding roller, and v) the diameter of the take-up roller, and wherein the take-up rotation speed is a rotation speed of the take-up roller rotated by the take-up motor.

2. The cleaning unit according to claim 1, wherein the controller includes:

a take-up motor controller sending a motor command value to the take-up motor and controlling the take-up motor so that the take-up motor rotates at a rotation speed indicated by the motor command value; and a take-up rotation speed calculator calculating the take-up rotation speed from the rotation speed indicated by the motor command value sent to the take-up motor by the take-up motor controller.

3. The cleaning unit according to claim 1, wherein the computer computes a roll diameter of the sheet wound in a rolled manner on the feeding roller based on the ratio of the take-up rotation speed and the feeding rotation speed.

4. The cleaning unit according to claim 1, further comprising a first separation wall dividing a region in which the feeding roller, the wiping roller and the take-up roller are arranged and a first region in which the rotation detector is arranged.

5. The cleaning unit according to claim 1, further comprising a second separation wall dividing a region in which the feeding roller, the wiping roller and the take-up roller are arranged and a second region in which the take-up motor is arranged.

6. The cleaning unit according to claim 1, further comprising a first rotation transmitter transmitting rotation of the feeding roller to the rotation detector.

7. The cleaning unit according to claim 1, wherein the rotation detector is arranged on a side opposite to the wiping roller with respect to the feeding roller.

8. The cleaning unit according to claim 1, further comprising a second rotation transmitter transmitting rotation of the take-up motor to the take-up roller.

9. The cleaning unit according to claim 1, wherein the take-up motor is arranged on a side opposite to the wiping roller with respect to the take-up roller.

10. The cleaning unit according to claim 1, wherein the rotation detector detects a rotation direction of the feeding roller.

11. A printing apparatus, comprising:

a discharge head discharging an ink to a printing medium; and the cleaning unit according to claim 1 cleaning the discharge head.

12. A roll diameter acquisition method, comprising:

taking up a sheet, which cleans a discharge head discharging an ink, fed from a feeding roller on which the sheet is wound in a rolled manner by a take-up roller; and computing a roll diameter of the sheet taken up in a rolled manner on the take-up roller based on i) a ratio of a take-up rotation speed and a feeding rotation speed, ii) an entire length of the sheet, iii) a thickness of the sheet, iv) a diameter of the feeding roller, and v) a diameter of the take-up roller, wherein the take-up rotation speed is a rotation speed of the take-up roller, the feeding rotation speed being a rotation speed of the feeding roller, and wherein information about the entire length of the sheet, the thickness of the sheet, the diameter of the feeding roller, and the diameter of the take-up roller are saved in a storage.

13. A cleaning unit comprising:

a feeding roller on which a sheet cleaning a discharge head which discharges an ink is wound in a rolled manner;

a take-up roller on which the sheet fed from the feeding roller is wound in a rolled manner;

a take-up motor rotating the take-up roller to take up the sheet fed from the feeding roller on the take-up roller;

a wiping roller bringing the sheet being conveyed from the feeding roller to the take-up roller by the take-up motor into contact with the discharge head;

a rotation detector detecting a feeding rotation speed, the feeding rotation speed being a rotation speed of the feeding roller;

a first separation wall dividing a region in which the feeding roller, the wiping roller, and the take-up roller are arranged and a first region in which the rotation detector is arranged; and a controller controlling drive of the take-up motor, wherein the controller includes a computer computing a roll diameter of the sheet taken up in a rolled manner on the take-up roller based on a ratio of a take-up rotation speed and the feeding rotation speed, the take-up rotation speed being a rotation speed of the take-up roller rotated by the take-up motor.

14. A cleaning unit comprising:

a feeding roller on which a sheet cleaning a discharge head which discharges an ink is wound in a rolled manner;

a take-up roller on which the sheet fed from the feeding roller is wound in a rolled manner;

a take-up motor rotating the take-up roller to take up the sheet fed from the feeding roller on the take-up roller;

a wiping roller bringing the sheet being conveyed from the feeding roller to the take-up roller by the take-up motor into contact with the discharge head;

a rotation detector detecting a feeding rotation speed, the feeding rotation speed being a rotation speed of the feeding roller;

a separation wall dividing a region in which the feeding roller, the wiping roller, and the take-up roller are arranged and a second region in which the take-up motor is arranged, and a controller controlling drive of the take-up motor, wherein the controller includes a computer computing a roll diameter of the sheet taken up in a rolled manner on the take-up roller based on a ratio of a take-up rotation speed and the feeding rotation speed, the take-up rotation speed being a rotation speed of the take-up roller rotated by the take-up motor.

* * * * *